(12) United States Patent
Evans et al.

(10) Patent No.: US 9,053,826 B2
(45) Date of Patent: Jun. 9, 2015

(54) PROTECTIVE GRID ATTACHMENT

(75) Inventors: Paul Marcus Evans, Chapin, SC (US); Michael Anthony Marzean, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1212 days.

(21) Appl. No.: 12/716,311

(22) Filed: Mar. 3, 2010

(65) Prior Publication Data

US 2011/0216873 A1 Sep. 8, 2011

(51) Int. Cl.
*G21C 3/352* (2006.01)
*G21C 3/334* (2006.01)

(52) U.S. Cl.
CPC .... *G21C 3/334* (2013.01); *Y02E 30/40* (2013.01)

(58) Field of Classification Search
USPC .................................................. 376/445, 440
See application file for complete search history.

(56) References Cited

U.S. PATENT DOCUMENTS

| | | | |
|---|---|---|---|
| 4,702,882 A * | 10/1987 | Stucker ..................... | 376/446 |
| 4,980,121 A | 12/1990 | Roberts et al. | |
| 5,444,748 A | 8/1995 | Beuchel et al. | |
| 6,522,710 B2 * | 2/2003 | Smith et al. ................ | 376/442 |
| 6,608,880 B2 | 8/2003 | Smith et al. | |
| 2005/0238131 A1 | 10/2005 | Hellandbrand, Jr. et al. | |
| 2006/0045231 A1 | 3/2006 | Lee et al. | |

* cited by examiner

*Primary Examiner* — Jack W Keith
*Assistant Examiner* — Sean P Burke
(74) *Attorney, Agent, or Firm* — Joseph C. Spadacene; Westinghouse Electric Company LLC

(57) ABSTRACT

A fuel assembly for a pressurized water reactor that has a protective grid attached to the bottom nozzle through a spacer insert captured between a control rod guide thimble end plug and the bottom nozzle. A thimble screw attaches the bottom nozzle to the control rod guide thimble end plug through a central opening in the spacer insert. The control rod guide thimble end plug is provided with a raised annular boss that encircles the thimble screw shank and rests against the upper surface of the bottom nozzle through the opening in the spacer insert. The opening in the spacer insert is large enough to provide both an axial and radial clearance between the spacer insert and the end plug to accommodate differences in thermal expansion.

14 Claims, 3 Drawing Sheets

PROTECTIVE GRID ATTACHMENT

BACKGROUND OF THE INVENTION

1. Field of the Invention

The present invention relates generally to nuclear reactors, and more particularly, to nuclear reactors having fuel assemblies that employ grids.

2. Description of the Related Art

In most water cooled nuclear reactors, the reactor core is comprised of a large number of elongated fuel assemblies. In pressurized water nuclear reactors, these fuel assemblies typically include a plurality of fuel rods held in an organized array by a plurality of grids spaced axially along the fuel assembly length and attached to a plurality of elongated thimble tubes. The thimble tubes typically receive control rods or instrumentation therein. Top and bottom nozzles are on opposite ends of the fuel assembly and are secured to the ends of the thimble tubes that extend slightly above and below the ends of the fuel rods.

During manufacture, subsequent installation and repair of components of the nuclear reactor coolant circulation system, a diligent effort is made to help assure the removal of all debris from the reactor vessel and its associated systems, which circulate coolant throughout the primary reactor coolant loop under various operating conditions. Although elaborate procedures are carried out to help assure debris removal, experience shows that in spite of the safeguards used to effect such removal, some chips and metal particles still remain hidden in the system. Most of the debris consists of metal turnings, which were probably left in the primary system after steam generator repair or replacement.

Fuel assembly damage due to debris trapped at the lower most grid has been noted in several reactors. Debris enters through the fuel assembly bottom nozzle flow holes from the coolant flow openings in the lower core support plate when the plant is started up. The debris tends to be engaged in the lower most support grid of the fuel assembly within the spaces between the fuel rod support cell walls of the grid and the lower end portions of the fuel rod tubes. The damage consists of fuel rod tube perforations caused by fretting of the debris in contact with the exterior of the cladding tubes which sealably enclose the fissile material in the fuel rod. Debris also becomes entangled in the lower nozzle plate holes. The flowing coolant causes the debris to gyrate, which tends to cut through the cladding of the fuel rods.

Due to the potential for debris to damage components of the fuel assembly, it is known to additionally provide a protective grid that is disposed between the bottom support grid and the lower nozzle. The protective grid functions as a filter to protect the fuel rods from debris. It is also known to securely dispose the protective grid against the lower nozzle and to space the protective grid from the lower nozzle in order to avoid undesirable contact between the lower nozzle and irregularities on the edges of the assembled straps of the grid.

All of the grids of the fuel assemblies of the nuclear reactor, including the protective grids, are typically made up of a plurality of straps that are arranged in a lattice pattern and are fastened to one another to define a plurality of cells. The cells include control rod guide thimble cells and fuel rod cells. The top support grid, bottom support grid and middle support grids are mechanically or otherwise fastened to the thimble tubes which are disposed in the thimble cells. The fuel rods typically are held within the fuel rod cells of the grids, including the protective grid, by a plurality of springs and/or dimples within each fuel rod cell that are formed in the straps of the grids.

The protective grid typically has spacers that are welded or otherwise attached to the underside of the grid and are securely captured between the protective grid and the fuel assembly bottom nozzle.

Cracking has recently been experienced in the protective grid features which has led to fuel rod failures. These failures have been determined to be caused by intergranular cracking, consistent with stress corrosion cracking. One of the sources of stress is the differential thermal expansion between the bottom nozzle and the protective grid, since the bottom nozzle is made of stainless steel and the protective grid is made of alloy-718. These parts are rigidly connected via a thimble screw which is screwed through the underside of the bottom nozzle and into the end plug on the control rod guide thimble. The stainless steel expands more during heat up than does the alloy-718, thus causing stresses in the protective grid, particularly near the attachment point.

Accordingly, a new means of attaching the protective grid is desired that will avoid the build-up of stresses during heat-up of the reactor.

SUMMARY OF THE INVENTION

This invention achieves the foregoing objective by providing an improved fuel assembly for a nuclear reactor. The fuel assembly has a plurality of elongated nuclear fuel rods having an extended axial length. A lower most grid supports the fuel rods in an organized array having unoccupied spacers to allow a flow of fluid coolant therethrough and past the fuel rods when the fuel assembly is installed in the nuclear reactor. A plurality of guide thimbles extend along the fuel rods and through the lower most grid. A bottom nozzle is disposed below the grid, below the lower ends of the fuel rods and supports the guide thimbles and permits the flow of fluid coolant into the fuel assembly. The bottom nozzle includes a substantially horizontal plate that extends transverse to the axis of the fuel rods and has an upper face directed toward the lower most grid. The upper face of the nozzle plate has defined therethrough a plurality of flow through holes that extend completely through the nozzle plate for the passage of the fluid coolant from a lower face of the nozzle plate to an upper face, with each of the coolant flow through holes in fluid communication with the unoccupied spaces. The lower most grid includes a plurality of straps that are interconnected with one another to define at least a first thimble cell through which one of the guide thimbles is supported. The straps each include a lower edge. A spacer in the form of a spacer plate is situated between the lower edge of the straps and the upper face of the bottom nozzle. The spacer plate has a substantially planar engagement surface and a substantially planar retention surface opposite one another, and is fixedly mounted on the underside of the lower most grid with the engagement surface protruding outwardly from the lower most grid. The engagement surface is structured to be disposed on the upper face of the bottom nozzle between the edge of the straps defining the first thimble cell and the upper face of the nozzle to space the grid from the nozzle. A hole in the spacer plate is structured to receive at least a portion of a fastener therethrough and the retention surface is structured to receive the end of the thimble tube when the fastener is received through the hole and is connected with the thimble tube. A portion of the end of the thimble tube protrudes through the hole to directly contact the upper face of the bottom nozzle and the portion of the end of the thimble tube that protrudes through the hole is sized to create a space in both the axial and radial directions between the end of the thimble tube and the spacer, so that in a cold condition the spacer does not substantially contact the end of the thimble tube.

Preferably, the space between the end of the thimble tube and the spacer is large enough to accommodate any differential in thermal expansion between the spacer material, the nozzle material and the end of the thimble tube. Desirably, the lateral space between the end of the thimble tube and the spacer is approximately between 0.001 and 0.002 inches (0.003 and 0.005 cms.). The lateral clearance takes up the differential thermal expansion. In addition, a small axial clearance provides for a non-rigid connection so that the grid, spacer and bottom nozzle can move independently.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
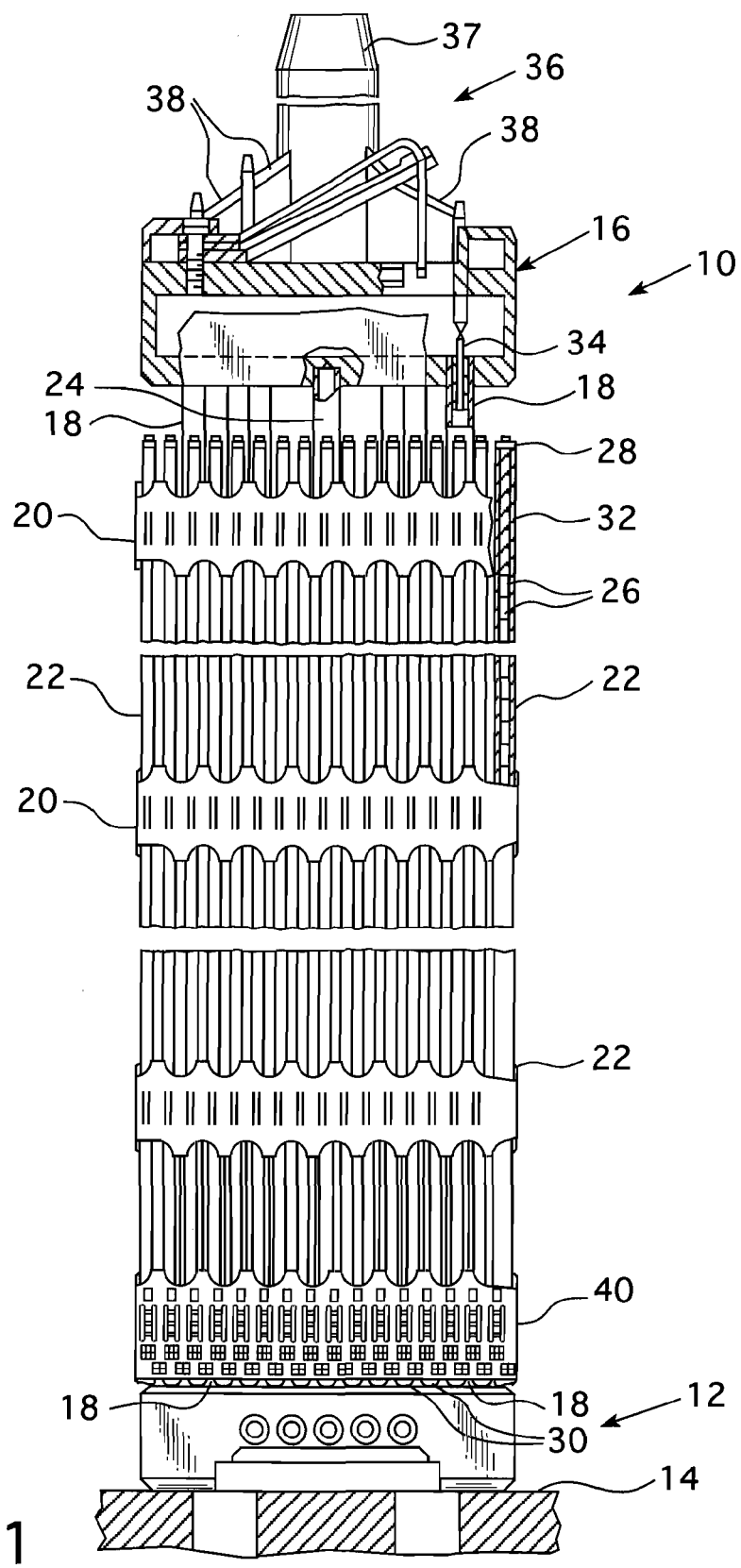
FIG. 1 is an elevational view, partially in section, of a fuel assembly in which the preferred embodiment of this invention is incorporated, the assembly being illustrated in vertically shortened form, with parts broken away for clarity.

Referring now to the drawings and particularly to FIG. 1, there is shown an elevational view of a fuel assembly, represented in vertically shortened form and being generally designated by reference character 10. The fuel assembly 10 is of the type used in a pressurized water reactor and has a structural skeleton which, at its lower end includes a bottom nozzle 12. The bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18, which extend longitudinally between the bottom and top nozzles 12 and 16 and at opposite ends are rigidly attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the fuel assembly 10 has an instrumentation tube 24 located in the center thereof that extends between and is either captured by or mounted to the bottom and top nozzles 12 and 16. With such an arrangement of parts, fuel assembly 10 forms an integral unit capable of being conveniently handled without damaging the assembly of parts.

As mentioned above, the fuel rods 22 in the array thereof in fuel assembly 10 are held in spaced relationship with one another by the grids 20 spaced along the fuel assembly length. Each fuel rod 22 includes nuclear fuel pellets 26 and is closed at opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor.

A liquid moderator/coolant such as water or water-containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work.

To control the fission process, a number of control rods 34 are reciprocably movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical hub 37 with a plurality of radially extending flukes or arms 38. Each arm 38 is interconnected to a control rod 34 such that the control rod mechanism 36 is operable to move the control rods vertically in the guide thimbles 18 to thereby control the fission process in the fuel assembly 10, all in a well known manner.

Figure 2:
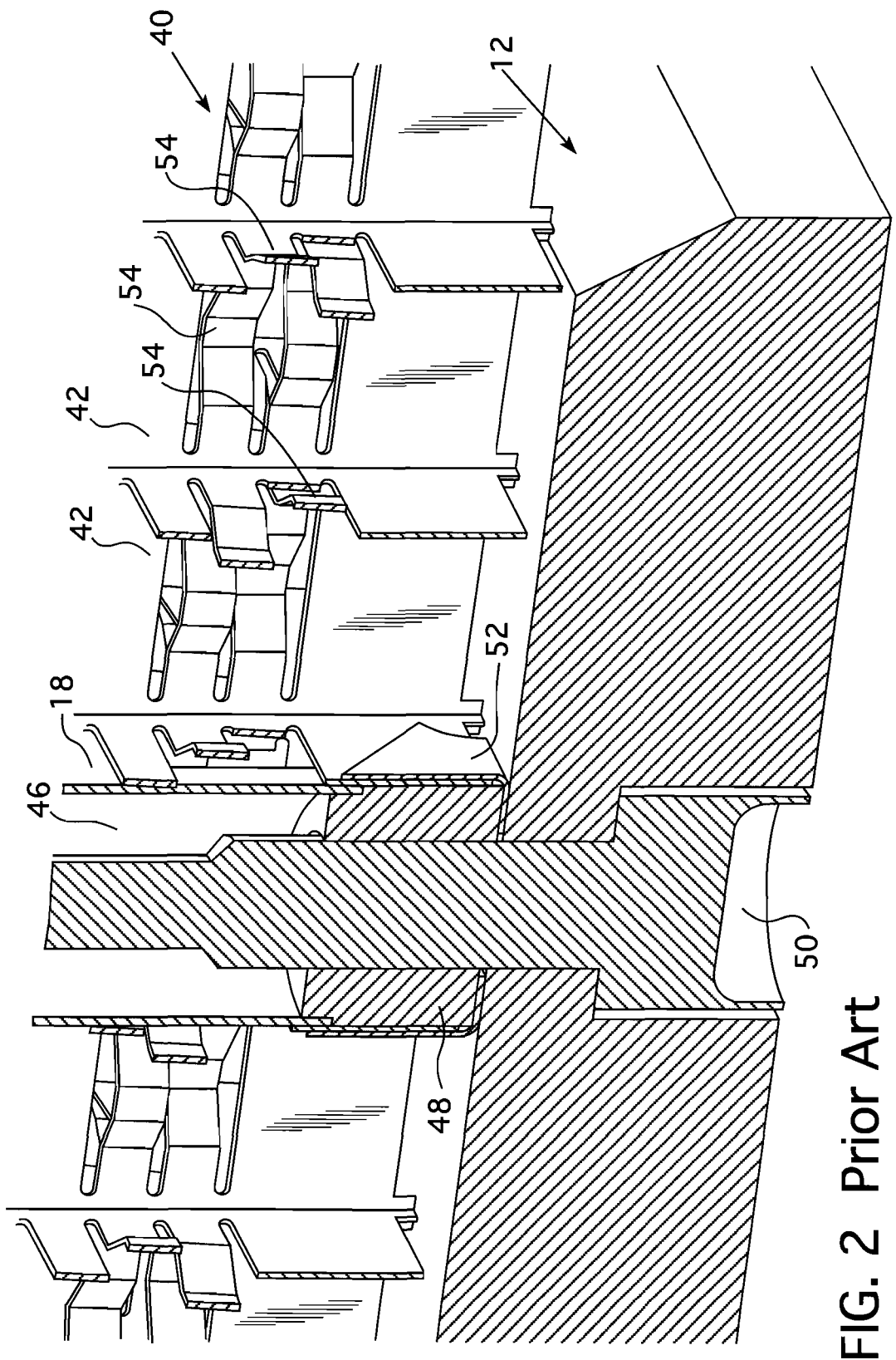
FIG. 2 is a cross section of a portion of the bottom nozzle and lower most grid of a fuel assembly like the one illustrated in FIG. 1, showing a prior art lower most grid to bottom nozzle connection.

A protective grid 40 is the lower most grid in the fuel assembly and functions to restrain debris entering the fuel assembly in the coolant flowing through the bottom nozzle. The protective grids 40 are similar to the other grids 20 in that they are made up of a plurality of straps that are arranged in a lattice pattern and are fastened to one another to define the plurality of cells some of which support fuel rods and others of which support control rod guide thimbles. A cross section of a prior art protective grid 40 attached to a bottom nozzle 12 is shown in FIG. 2. The fuel rod cells are designated by reference character 42 and the guide thimble cells are designated by reference character 46. Each of the fuel rod cells has dimples 54 for supporting the fuel rods within the cells. A guide thimble 18 having an end plug 48 is secured within a guide thimble support cell 46 by a thimble screw 50 that is screwed through the underside of the bottom nozzle 12 into the end plug 48 to secure the guide thimble 18 to the bottom nozzle 12. A spacer 52 is interposed between the bottom nozzle 12 and the end plug 48. FIG. 2 illustrates the basic geometry of a current protective grid joint typically employed in fuel assemblies with a "tube-in-tube" configuration, where the bottom grid does not have inserts. The "tube-in-tube" design refers to fuel assemblies that have control rod guide thimbles that include a dashpot that is formed from a tube inside the thimble cladding and employ grid straps that are constructed from Zircalloy or Inconel, and guide thimbles constructed from Zircalloy. In such an arrangement relatively short lengths of either Zircalloy or Inconel sleeves are welded or braised to the control rod guide thimble support cells. The Zircalloy guide thimbles 18 are then inserted through these sleeves and the guide thimbles are bulged at the sleeve location to establish a mechanical joint that affixes the grids to the guide thimbles at the appropriate elevations.

In the tube-in-tube configuration, the protective grid has the spacer 52 inserted between the control rod guide thimble end plug 48 and the bottom nozzle 12 with the ends of the spacer wrapped around and welded to the walls of the adjacent fuel rod support cells 42. This configuration provides for a very rigid joint. Recently, cracking of the protective grid features has been identified which has led to fuel rod failures. These failures have been determined to be intergranular cracking, consistent with stress corrosion cracking. One of the sources of stress is the differential thermal expansion between the bottom nozzle 12 and the protective grid 40 since the bottom nozzle is made of stainless steel and the protective grid is made of Alloy-718. The stainless steel expands more during heat-up than does the Alloy-718, thus causing stresses in the protective grid, particularly near the attachment point.

This invention provides a new means of attachment that will avoid the stresses that had previously built up during heat up of the reactor.

Figure 3:
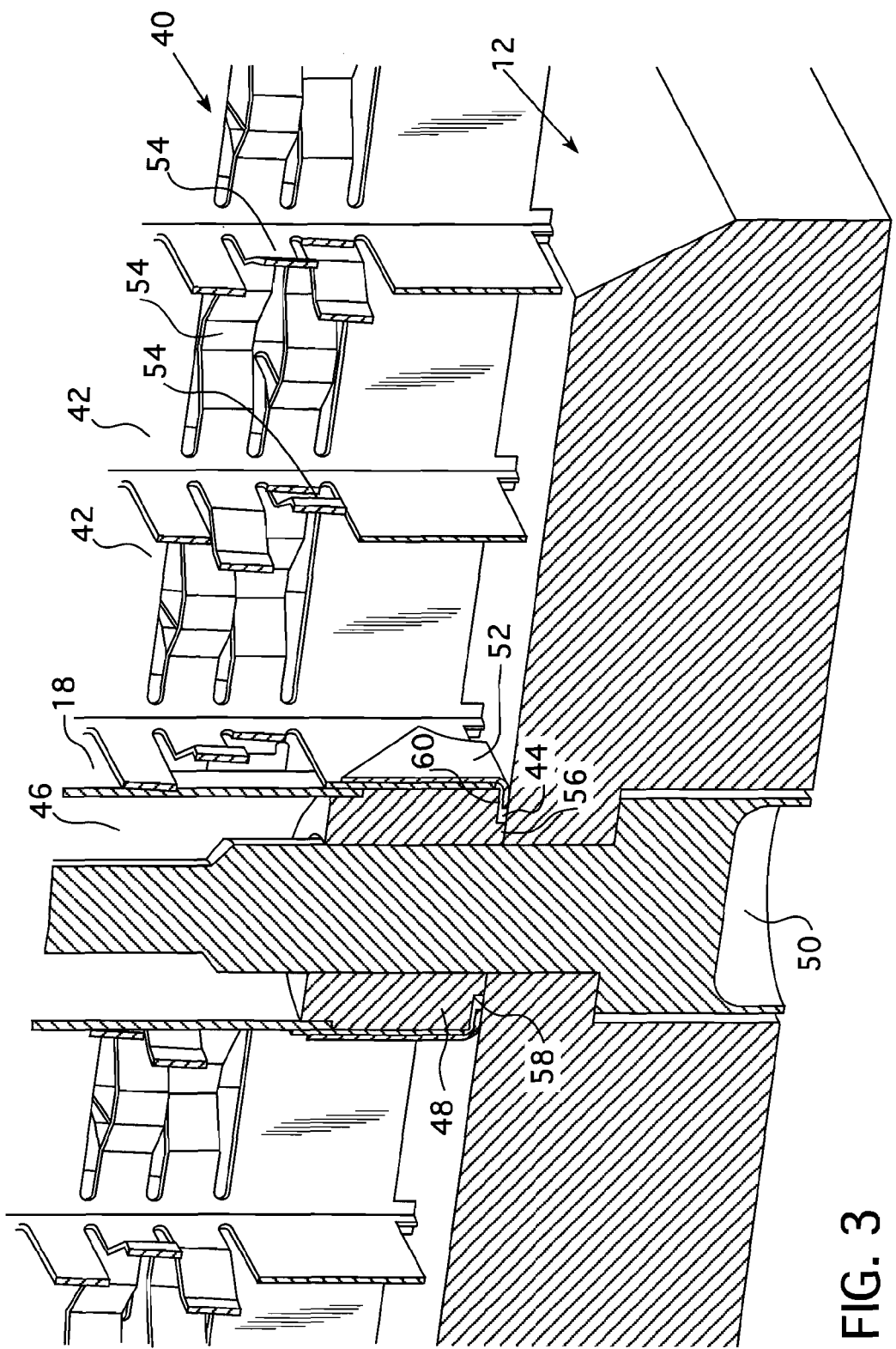
FIG. 3 is a cross section of a portion of the lower most grid and bottom nozzle illustrated in FIG. 1 showing the lower most grid to bottom nozzle connection of this invention.

FIG. 3 illustrates the attachment arrangement of this invention that uses the same spacer design 52 as the current configuration illustrated in FIG. 2, except that the hole 56 in the spacer 52 is larger. The spacer 52 is captured between either the bottom grid insert end plug (for a swaged dash-pot design) or the thimble tube end plug (for tube-in-tube designs, the latter being shown in FIG. 3). The key difference is that there is a step 58 in either the insert end plug or the guide tube end plug such as to provide a minimal lateral and axial clearance between the end plug 48 and the spacer 52. The lateral clearance 44 is just enough to accommodate tolerances and the differential in thermal expansion among the parts. Preferably, the axial clearance 60 is between 0.001 inch to 0.010 inch (0.003 to 0.025 cm) and preferably between 0.001 inch to 0.002 inch, (0.003 and 0.005 cm). This small clearance will allow for a small amount of relative movement between the parts during heat-up and expansion of the parts. The lateral clearance 44 is at least as, if not more important than the axial clearance 60. There is no substantial axial differential thermal expansion, only lateral. However, the clearance will be sufficiently small to preclude vibration of the grid during operation or significant movement of the grid prior to rod loading. Since a significant portion of the grid retention force is the interaction with the rods, and since the flow in the joint area is not high and the relative clearance of the parts is not large, vibration of the joint is not a significant concern. However, the clearance between the spacer 52 and the end plug 48 will be sufficient to significantly reduce the stresses experienced by the protective grid that were responsible for the intergranular cracking and fuel rod failures that have been experienced.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. In combination, a grid and spacer for use in a fuel assembly of a nuclear reactor, the fuel assembly including a bottom nozzle, a thimble tube having an end, and a fastener, the fastener being structured to cooperatively connect the bottom nozzle with the thimble tube, the combination comprising:
   a grid including a plurality of straps interconnected with one another to define at least a first thimble cell, the straps each including a lower edge;
   a spacer in the form of a plate formed with a hole extending there-through, the plate having a substantially planar engagement surface and a substantially planar retention surface opposite one another, the plate being fixedly mounted on the grid with the engagement surface protruding outwardly from the grid, the engagement surface being structured to be disposed on the bottom nozzle between the edge of the straps defining the first thimble cell and the bottom nozzle to space the grid from the nozzle, the hole being structured to receive at least a portion of the fastener there-through, and the retention surface being structured to receive the end of the thimble tube when the fastener is received through the hole and is cooperatively connected with the thimble tube, wherein a portion of the end of the thimble tube protrudes through the hole to directly contact the bottom nozzle and wherein the portion of the end of the thimble tube that protrudes through the hole is sized to create a space in both an axial and radial direction between the end of the thimble tube and the spacer, so that in a cold condition the spacer does not substantially contact the end of the thimble tube.

2. The combination as set forth in claim 1 wherein the radial space between the end of the thimble tube and the spacer is large enough to accommodate any differential in thermal expansion in the radial direction between the spacer material and the nozzle material.

3. The combination as set forth in claim 1 wherein the axial space between the end of the thimble tube and the spacer is approximately between 0.001 and 0.010 inch (0.003 and 0.025 cm).

4. The combination as set forth in claim 3 wherein the axial space between the end of the thimble tube and the spacer is approximately between 0.001 and 0.002inch (0.003 and 0.005 cm).

5. The combination as set forth in claim 1 wherein the straps and the bottom nozzle are constructed from different materials.

6. The combination as set forth in claim 1 wherein the spacer and the grid are made of substantially the same material and the spacer is fixedly mounted on the grid by welding.

7. The combination as set forth in claim 1 wherein the spacer and the grid are fixedly mounted on the bottom nozzle with a mechanical coupling.

8. A fuel assembly for a nuclear reactor including:
   a plurality of elongated nuclear fuel rods having an extended axial length;
   a lowermost grid supporting said fuel rods in an organized array and having unoccupied spaces defined therein to allow a flow of fluid coolant there-through and past said fuel rods when said fuel assembly is installed in the nuclear reactor;
   a plurality of guide thimbles extending along said fuel rods and through said lowermost grid;
   a bottom nozzle is disposed below said grid, below lower ends of said fuel rods and supporting said guide thimbles and permitting the flow of fluid coolant into said fuel assembly, said bottom nozzle comprising a substantially horizontal nozzle plate extending transverse to the axis of the fuel rods and having an upper face directed toward said lowermost grid, said upper face of said nozzle plate having defined there-through a plurality of flow through holes extending completely through said nozzle plate for the passage of the fluid coolant from a lower face of said nozzle plate to the upper face of said nozzle plate, each of said coolant flow through holes in fluid communication with said unoccupied spaces;
   the lowermost grid including a plurality of straps interconnected with one another to define at least a first guide thimble cell through which one of the guide thimbles is supported, the straps each including a lower edge; and
   a spacer in the form of a spacer plate formed with a hole extending there-through, the spacer plate having a substantially planar engagement surface and a substantially planar retention surface opposite one another, the spacer plate being fixedly mounted on an underside of the lowermost grid with the engagement surface protruding outwardly from the lowermost grid, the engagement surface being structured to be disposed on the upper face of the bottom nozzle between the edge of the straps defining the first thimble cell and the upper face of the nozzle to space the grid from the nozzle, the hole being structured to receive at least a portion of a fastener there-through, and the retention surface being structured to receive the end of the thimble tube when the fastener is received through the hole and is cooperatively connected with the thimble tube, wherein a portion of the end of the thimble tube protrudes through the hole to directly contact the upper face of the bottom nozzle and wherein the portion of an end of the thimble tube that protrudes through the hole is sized to create a space in both an axial and radial direction between the end of the thimble tube and the spacer, so that in a cold condition the spacer does not substantially contact the end of the thimble tube.

9. The combination as set forth in claim 8 wherein the radial space between the end of the thimble tube and the spacer is large enough to accommodate any differential in thermal expansion between the spacer material, the nozzle material and the end of the thimble tube.

10. The combination as set forth in claim 8 wherein the axial space between the end of the thimble tube and the spacer is approximately between 0.001 and 0.010 inch (0.003 and 0.025 cm).

11. The combination as set forth in claim 10 wherein the space between the end of the thimble tube and the spacer is approximately between 0.001 and 0.002 inch (0.003 and 0.005 cm).

12. The combination as set forth in claim 8 wherein the straps and the bottom nozzle are constructed from different materials.

13. The combination as set forth in claim 8 wherein the spacer and the grid are made of substantially the same material and the spacer is fixedly mounted on the grid by welding.

14. The combination as set forth in claim 8 wherein the spacer and the grid are fixedly mounted on the bottom nozzle with a mechanical coupling.

\* \* \* \* \*